(12) United States Patent
Chen et al.

(10) Patent No.: US 9,038,666 B2
(45) Date of Patent: May 26, 2015

(54) ELECTROMAGNETIC FLOW CONTROLLER

(75) Inventors: Wei Chen, Greenville, SC (US); Kevin McMahan, Greer, SC (US); Shiva Srinivasan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 13/454,777

(22) Filed: Apr. 24, 2012

(65) Prior Publication Data
US 2013/0276893 A1    Oct. 24, 2013

(51) Int. Cl.
| | |
|---|---|
| *B01F 5/04* | (2006.01) |
| *F04B 19/00* | (2006.01) |
| *B01F 5/24* | (2006.01) |
| *F16K 31/08* | (2006.01) |

(52) U.S. Cl.
CPC ............... *F04B 19/006* (2013.01); *B01F 5/245* (2013.01); *F16K 31/08* (2013.01)

(58) Field of Classification Search
CPC ......... F16K 31/08; F04B 19/006; B01F 31/08
USPC ........... 137/82–86, 896, 897; 251/65, 129.01; 366/167.1, 175.2, 177.1, 179.1, 182.1, 366/182.4
See application file for complete search history.

(56) References Cited

U.S. PATENT DOCUMENTS

| | | | | |
|---|---|---|---|---|
| 4,585,209 | A * | 4/1986 | Aine et al. ............... | 251/129.02 |
| 4,826,131 | A * | 5/1989 | Mikkor ..................... | 251/129.17 |
| 6,485,273 | B1 * | 11/2002 | Goodwin-Johansson | . 417/410.2 |
| 6,935,373 | B2 * | 8/2005 | Wygnanski .............. | 137/625.44 |
| 6,939,032 | B2 * | 9/2005 | Cosby et al. ............. | 366/114 |
| 7,195,393 | B2 * | 3/2007 | Potter ...................... | 366/114 |
| 2003/0116738 | A1 * | 6/2003 | O'Connor et al. ....... | 251/129.14 |
| 2011/0073788 | A1 * | 3/2011 | Marcus et al. ........... | 251/30.01 |

OTHER PUBLICATIONS

H. Suzuki et al. "Active Control of an Axisymmetric Jet with Distributed Electromagnetic Flap Actuators." Department of Mechanical Engineering, The University of Tokyo. Experimental in Fluids 36 (2004) 498-509.

* cited by examiner

*Primary Examiner* — John K Fristoe, Jr.
*Assistant Examiner* — Reinaldo Sanchez-Medina
(74) *Attorney, Agent, or Firm* — Sutherland Asbill & Brennan LLP

(57) ABSTRACT

Systems, methods and apparatus for providing an electromagnetic flow controller. In one embodiment, an electromagnetic flow controller can have two substrates, a permanent magnet, and two electrical traces. One of the substrates may deflect away from the other substrate upon applying an electrical signal to at least one of the two electrical traces.

20 Claims, 8 Drawing Sheets

ELECTROMAGNETIC FLOW CONTROLLER

FIELD OF THE DISCLOSURE

This disclosure generally relates to flow controllers, and in particular to electromagnetic flow controllers.

BACKGROUND OF THE DISCLOSURE

Combustion systems generally mix one or more fluids, such as fuel and air, before providing the same to a combustion chamber. A combustion nozzle assembly may be provided upstream of the combustion chamber and may provide fuel and air mixtures to the combustion chamber. Therefore, the combustion nozzle assembly may mix fuel and air in suitable proportions to operate the combustion chamber under suitable parameters. The mixing may be performed by flowing fuel in a particular conduit and by flowing air in another conduit and mixing the two through appropriate orifices. Accordingly, the mixing proportions as well as other parameters may be controlled by modulating, such as baffling, the flow of one or more of the fuel and air through the orifices.

In certain aspects, the mixing of two fluids through an orifice may be controlled by providing obstructions to the flow of one or more of the two fluids in proximity of the orifice. Therefore, the obstruction to the flow of one or more of the two fluids may be controlled by the level of perturbation of the flow of the one or more of the two fluids when obstructed by the obstruction.

In the case of combustion nozzle assemblies, an apparatus for the control of fuel and air mixtures may be used to control the fluctuation of fuel in a fuel conduit prior to mixing with air, thereby controlling the fluctuation of a heat released during combustion. These fluctuations are also commonly referred to as q-prime. Similarly, apparatus for the control of air velocity and pressure fluctuation in proximity of a mixing orifice upstream of the combustion chamber may be provided to control the fuel air mixture or proportions. These pressure fluctuations are also commonly referred to as p-prime.

In certain aspects, the control apparatus that may be utilized to control the fuel and air mixture upstream of the combustion chamber may need to operate at relatively high temperatures. In certain cases, the high temperature operation may limit the choice of apparatus that may be used for the purposes of controlling the fuel air mixture. Commonly, the temperature of operation may exceed the Curie temperatures of commonly used ferroelectric materials.

BRIEF SUMMARY OF THE DISCLOSURE

Certain embodiments of the disclosure may provide fluid flow controllers that may be disposed in proximity of the fluid mixing orifice. The fluid flow controllers may be controlled to selectively perturb the flow of fluids in a direction perpendicular to the mixing orifice. By controlling the flow of fluids, the effective pressure of one or more of the fluids at the mixing orifice may be controlled. In one aspect, the fluid flow controllers may control the volume of fluid traversing the mixing orifice in a unit of time. Further, the fluid flow controllers may control the flux of fluid flow through the mixing orifice. The fluid flow controllers may be an electromagnetic flow controller, including two substrates that deflect from each other when one or more electrical signals are applied thereto. In certain aspects, the electromagnetic flow controller may have an electrical signal applied thereto for the purpose of maintaining its operating parameters under various operating conditions. The electromagnetic flow controller may operate at temperatures exceeding the Curie temperature of various ferroelectric materials. In certain embodiments, the electromagnetic flow controller may have a permanent magnet disposed on one or the other substrate. The permanent magnet may be constructed from ferroelectric material and the electromagnetic flow controller may operate at temperatures that exceed the Curie temperature of the ferroelectric material of the permanent magnet.

In one embodiment, an apparatus may include a first substrate with a first electrical trace thereon and a second substrate with a permanent magnet and a second electrical trace thereon and connected to the first substrate. The first substrate may deflect from the second substrate when an electrical signal is provided to the first electrical trace.

In another embodiment, a method may include providing a first substrate with a first electrical trace thereon and providing a second substrate with a permanent magnet and a second electrical trace thereon and connected to the first substrate. The method may further include providing an electrical signal on the first electrical trace and deflecting the first substrate from the second substrate based at least in part on the provided electrical signal.

In yet another embodiment, a system may include a vane with an inner surface and an outer surface, and an orifice through the vane extending from the inner surface to the outer surface. The system may further include at least one electromagnetic flow controller disposed in proximity of the orifice on the inner surface, wherein a first fluid flows from the inner surface through the orifice and at least partially mixes with a second fluid after flowing through the orifice, and wherein each of the at least one electromagnetic flow controllers comprise include a first substrate with a first electrical trace thereon and a second substrate with a permanent magnet and a second electrical trace thereon and connected to the first substrate. The first substrate may deflect from the second substrate when an electrical signal is provided to the first electrical trace.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE DISCLOSURE

Figure 1:
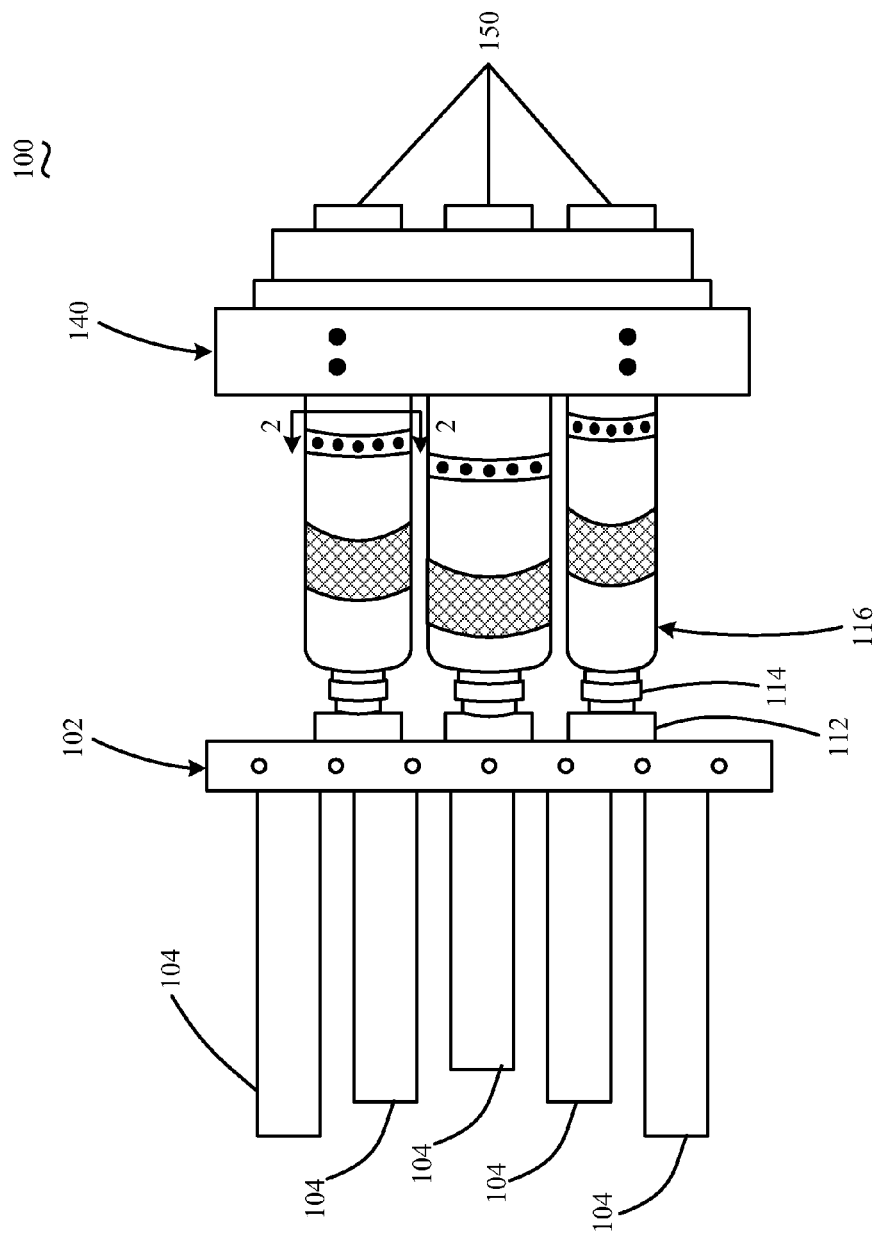
FIG. 1 is a simplified schematic diagram illustrating an example combustion nozzle assembly operated according to embodiments of the disclosure.

Embodiments of the disclosure are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for controlling the flow of fluids through an orifice. The apparatus may be an electromagnetic flow controller. The electromagnetic flow controller may be modulated to selectively perturb the flow of fluid through an orifice in proximity of the electromagnetic flow controller. The electromagnetic flow controller may include a stationary substrate and a deflecting substrate coupled to each other on one end. The electromagnetic flow controller may further have an electrical trace provided on the deflecting substrate that when energized with an electrical signal may result in the deflecting substrate deflecting away from the stationary substrate. The electromagnetic flow controller may further yet have an electrical trace provided on the stationary substrate that when energized with an electrical signal may result in the electromagnetic flow controller maintaining its operating parameters and operating characteristics in a relatively wide variety of operating conditions, such as relatively high temperature operations. In certain, embodiments, the electrical signal provided to the electrical trace on the stationary substrate may provide a driving force for maintaining magnetic domain alignment of magnetic domains of a ferroelectric based permanent magnet provided on the stationary substrate. The electromagnetic flow controller may be provided, in certain embodiments, on a combustion nozzle assembly operating at a relatively high ambient temperature for the purposes of mixing a fuel and air in proportion suitable for combustion. In one aspect, the electromagnetic flow controller may operate at temperatures greater than about 700° F.

While described herein in the context of a combustion chamber or a combustion nozzle assembly for a combustion chamber, it will be appreciated that the electromagnetic flow controller may be used for any suitable fluid flow control application. For example, the electromagnetic flow controller may be used for mixing any variety of fluids, such as any variety of liquids or gases. The electromagnetic flow controller may be operated in any suitable ambient condition, including at a relatively low temperature or a relatively high temperature. In certain embodiments, the electromagnetic flow controller may be operated at temperatures that exceed the Curie temperature of various ferroelectric materials.

Example embodiments of the invention will now be described with reference to the accompanying figures.

Referring now to FIG. 1, a simplified schematic diagram of an example combustion nozzle assembly 100 as illustrated may include a nozzle assembly rear face 102 with a variety of fluid feed tubes 104 connected thereto. The fluid feed tubes 104 may provide fluids, such as liquids and gases, to the combustion nozzle assembly 100. The fluids may include, for example, liquid fuels, gaseous fuels, air, or other oxidants. The fluids may traverse connector conduits 112 and 114 to enter one or more fuel air mixing cylinders 116. The fuel air mixing cylinders 116 may be mechanically supported by the nozzle assembly rear face 102 and a nozzle assembly front face 140. The fluids that enter the fuel air mixing cylinder 116 may be mixed with each other therein and the mixed fluid may flow through nozzles 150 into a combustion chamber (not shown). The fuel air mixing cylinder 116 may, as an example, mix one or more fluidized fuels with air. The fluidized fuel may be either a gas or a liquid at the operating temperatures and pressures of the mixing cylinder 116.

While three fuel air mixing cylinders 116 and nozzles 150 are depicted, it will be appreciated that there may be any suitable number of fuel air mixing cylinders 116 and nozzles 150. In certain embodiments, each fuel air mixing cylinder 116 may have a respective corresponding nozzle 150. In other embodiments, there may be a dissimilar number of fuel air mixing cylinders 116 and nozzles and there may not be a one-to-one correspondence between a particular fuel air mixing cylinder and a particular nozzle.

Figure 2:
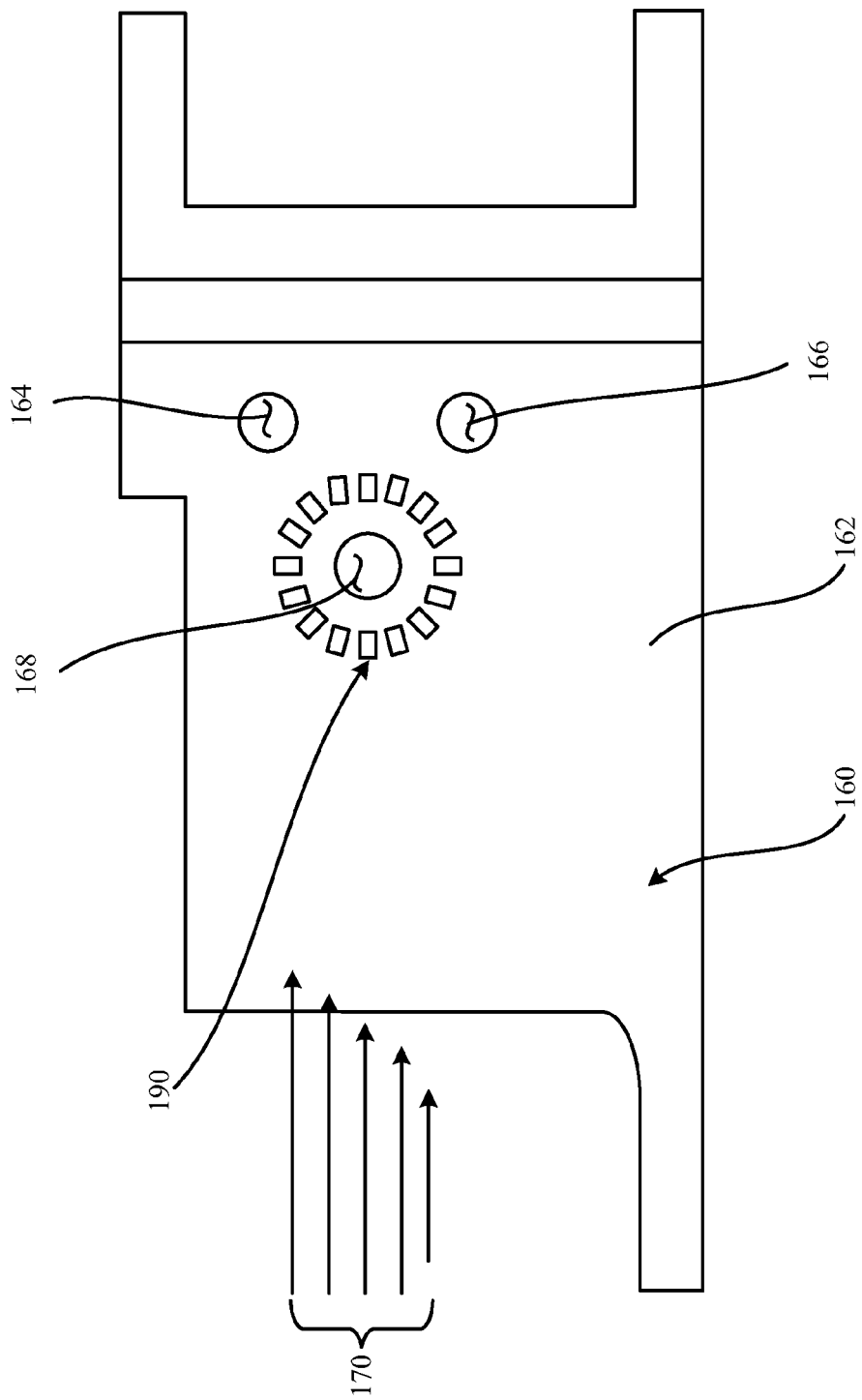
FIG. 2 is a simplified schematic cross sectional diagram illustrating an example inside surface of a vane included in the combustion nozzle assembly of FIG. 1 according to embodiments of the disclosure.
Figure 3:
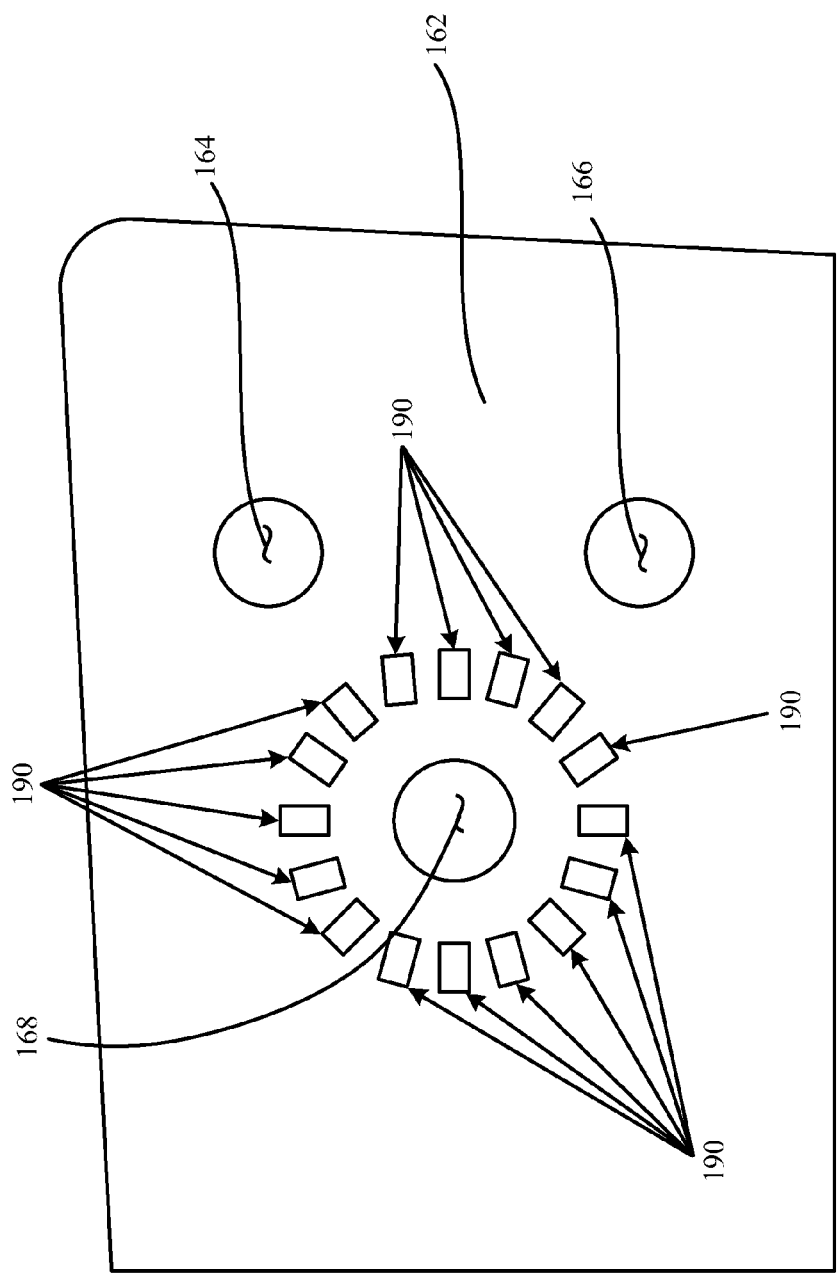
FIG. 3 is a simplified schematic diagram illustrating an example inside surface of a vane included in the combustion nozzle assembly of FIG. 2 according to embodiments of the disclosure.
Figure 4:
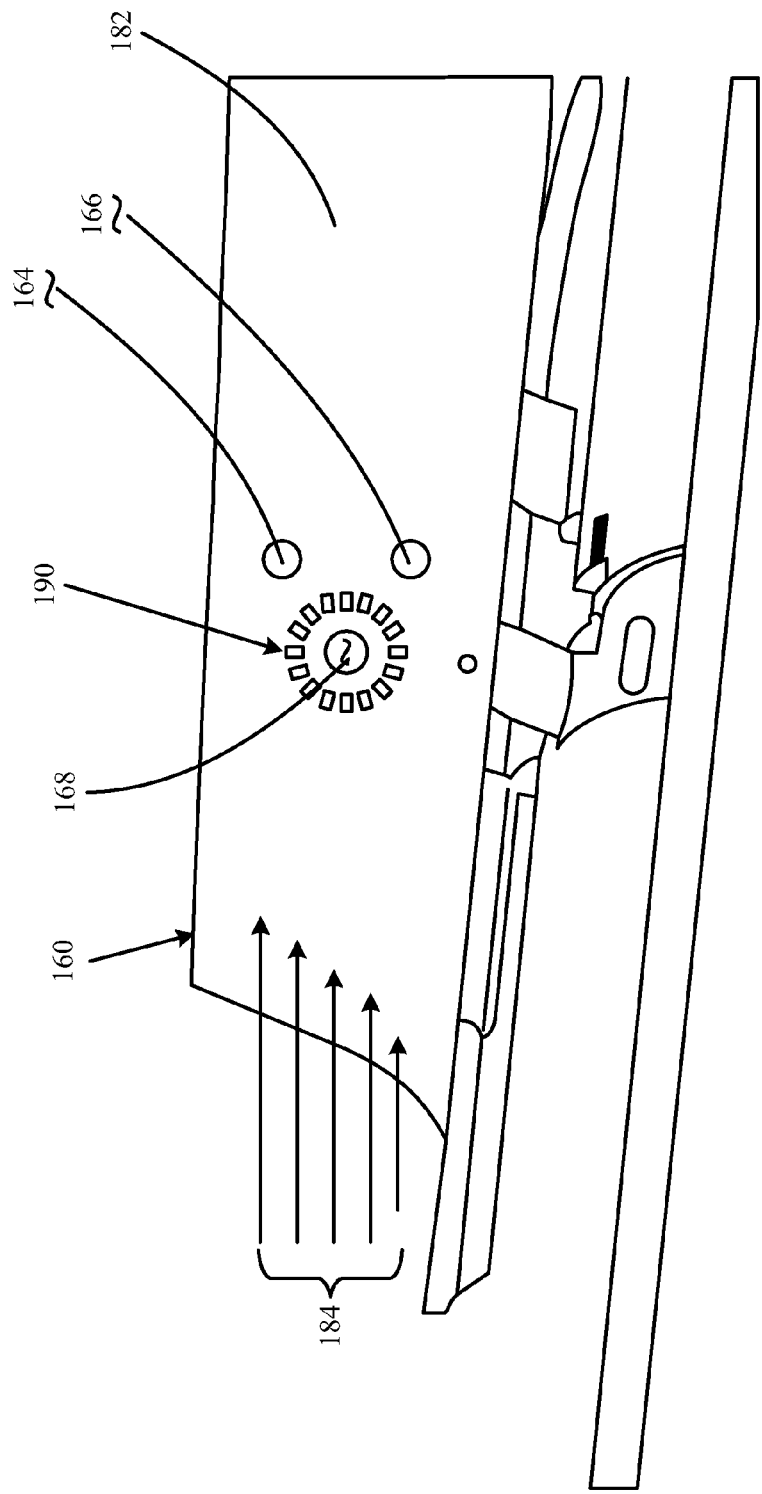
FIG. 4 is a simplified schematic diagram illustrating the example orifice on an outside surface of the vane of FIG. 2 with electromagnetic flow controllers disposed thereon according to embodiments of the disclosure.

Referring now to FIGS. 2-4, a cross sectional view through one of the example fuel air mixing cylinders 116 is illustrated to have at least one vane 160. The vane 160 may include an inner surface 162 as depicted in FIGS. 2 and 3, with one or more holes 164, 166, 168 therethrough. There may be fluid flow inside of the vane 160, as indicated by the arrows 170. The fluid flow inside of the vane may be through a conduit defined by the inner surface 162 of the vane 160. As depicted in FIG. 4, the vane 160 may also have an outer surface 182 and there may be fluid flow outside of the vane 160 as depicted by fluid 184. Therefore, the fluid flow on the outside of the vane 160 may be through a conduit defined by the outer surface 182 and the inner surface (not shown) of the fuel air mixing cylinder 116. In certain embodiments, the fluid 170 flowing on the inside of the vane 160 may dissimilar to the fluid 184 flowing on the outside of the vane 160. In one aspect, the fluid 170 may be a fuel, such as a hydrocarbon fuel, and the fluid 184 may be an oxidizer, such as oxygen or air. In some cases one or more of the fluids 170 and 184 may be a mixture of multiple fluidic compounds. For example, the fluid 170 may be a mixture of multiple hydrocarbon compounds, such as methane, ethane, butane, and propane. Additionally, in some cases, the fluids 170, 184 may be different phases than each other. For example, the fluid 170 may be a liquid and the fluid 184 may be a gas in accordance with embodiments of the disclosure. In other embodiments, the fluids 170, 184 may be the same fluid.

In certain embodiments, the pressure of the fluid 170 inside of the vane 160 may exceed the pressure of the fluid 184 on the outside of the vane 160. As a result, during the operation of the combustion nozzle assembly 100, the fluid 170 may flow through the one or more holes 164, 166, 168 and mix with fluid 184 on the outside of the vane 160 and within the fuel air mixing cylinder 116 of the combustion nozzle assembly 100. The rate, proportion, and consistency over time of mixing of the fluid 170 with the fluid 184 may depend on the volume of fluid 170 that flows through the holes 164, 166, 168 over time. Therefore, various aspects of the mixing of the fluids 170 and 184 may be controlled by controlling the flow of fluid 170 through one or more of the holes 164, 166, 168 over time.

There may be one or more electromagnetic flow controllers 190 disposed on the inner surface 162 in proximity of one or more of the holes 164, 166, 168. There may also be one or more electromagnetic flow controllers 190 disposed on the outer surface 182 in proximity of one or more of the holes 164, 166, 168. In this example embodiment, the electromagnetic flow controllers 190 are depicted as surrounding the hole 168 both on the inner surface 162 and the outer surface 182. The electromagnetic flow controllers 190 may be able modulate the flow of fluids through the hole 168.

While a single vane 160 is described herein, it will be appreciated that each fuel air mixing cylinder may include any suitable number of vanes therein. While three holes 164, 166, 168 are depicted via which fluids 170, 184 mix, it will be appreciated that there may be any suitable number of holes through the walls of the vane 160. It should also be noted that while a single hole 168 is shown in this example embodiment to have electromagnetic flow controllers 190 in the proximity thereof, any number of the holes 164, 166, 168 may have electromagnetic flow controllers 190 associated therewith. Additionally, there may be any suitable number of electromagnetic flow controllers 190 in proximity of a particular hole 164, 166, 168. Further yet, the electromagnetic flow controllers may be provided on the inner surface and the outer surface of the same hole as depicted here or on different holes.

In certain embodiments the electromagnetic flow controllers 190 provided on the vane 160 may be electrically modulated by providing an electrical control signal to the same via electrical connection(s) (not shown) to the electromagnetic flow controllers 190. In one aspect, two electrical signals may be provided the electromagnetic flow controller 190 for the operation of the same. The first signal may be provided for modulating and controlling the fluid flow through the hole in proximity to the electromagnetic flow controller. The second signal may be provided for the purposes of maintaining the operating characteristics of the flow controller over time and use, particularly when using in a relatively high temperature ambient.

It should also be noted, that the combustion nozzle assembly 100 may be modified in various ways in accordance with certain embodiments of the invention. For example, in certain embodiments, one or more elements may be eliminated or substituted with equivalent or nearly equivalent elements. Additionally, in other embodiments, other elements may be added to or present in the combustion nozzle assembly 100.

Figure 5:
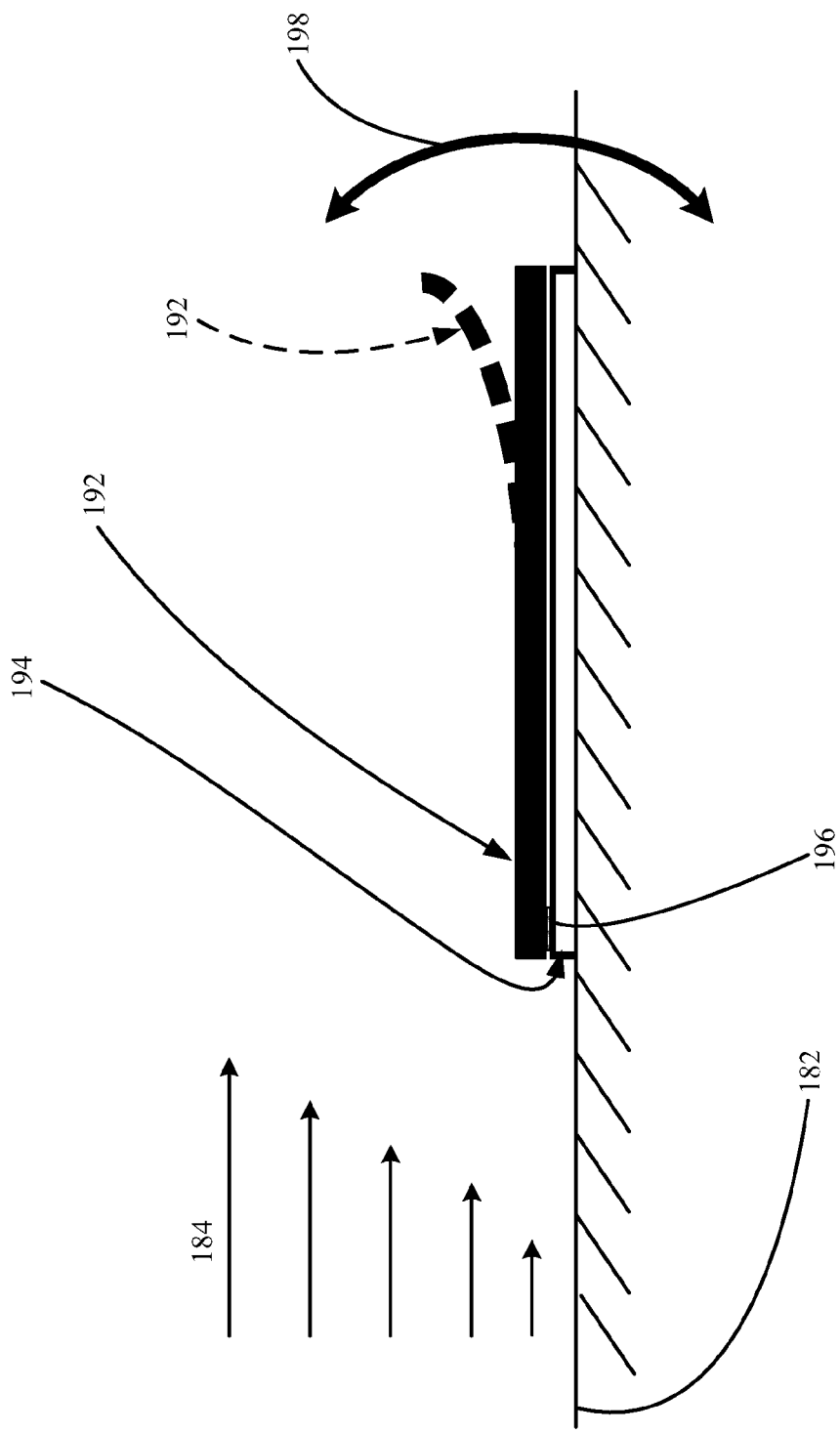
FIG. 5 is a simplified schematic diagram illustrating an example electromagnetic flow controller disposed on the vane of FIG. 2 according to embodiments of the disclosure.

Now referring to FIG. 5, the operation of the example electromagnetic flow controllers 190 are described by considering a single electromagnetic flow controller 190 provided on the outer surface 182 of the vane 160 and fluid flow 184 flowing substantially along the outer surface 182. The electromagnetic flow controller 190 may include a first substrate, or a deflecting substrate 192 mechanically coupled to a second substrate, or stationary substrate 194 via one or more connection points 196. As depicted, in certain example embodiments, of the disclosure, the deflecting substrate 192 may be connected via the one or more connection points 196 to the stationary substrate 194 in a cantilever type configuration. Further, as depicted, the stationary substrate 194 may be mechanically fixed to a surface, such as the outer surface 182 of the vane 160.

In operation, if an electrical signal is applied to an electrical trace on the deflecting substrate 192, then the deflecting substrate 192 may deflect away from the stationary substrate 194, as depicted by the arrow 198. In one aspect, the magnitude and frequency of the electrical signal applied to the deflecting substrate may control the level of deflection. In certain embodiments, the electrical signal applied may be a repeating signal of a particular frequency, such as a sinusoidal wave. In such a case, the deflecting substrate 192 may repeatedly deflect away from and deflect towards the stationary substrate 194. This may be visualized as a flapping motion of the deflecting substrate 192.

The deflecting substrate 192 may be constructed of any number of suitable materials. In certain embodiments, the deflecting substrate 192 may be constructed of metal, such as, for example, nickel, cobalt, tungsten, titanium, iron, copper, or the like. In other embodiments, the deflecting substrate 192 may be constructed from plastics, ceramics, or any other suitable material. It will be appreciated that the deflecting substrate 192 may be subject to cycling fatigue under certain operating conditions, such as relatively high cycling conditions. Accordingly, materials may be selected for construction of the same that have relatively high durability to cycling fatigue.

In certain embodiments, the level of maximum deflection of the deflecting substrate 192 from the stationary substrate 194 may be in the range of approximately 60 mils (1.5 mm) to 100 mils (2.5 mm). In certain embodiments, the electromagnetic flow controller 190 may operate at ambient temperatures greater than about 500° F. In certain further embodiments, the electromagnetic flow controller 190 may operate at ambient temperatures greater than about 800° F. In yet further embodiments, the electromagnetic flow controller 190 may operate at ambient temperatures greater than about 1100° F.

Figure 6:
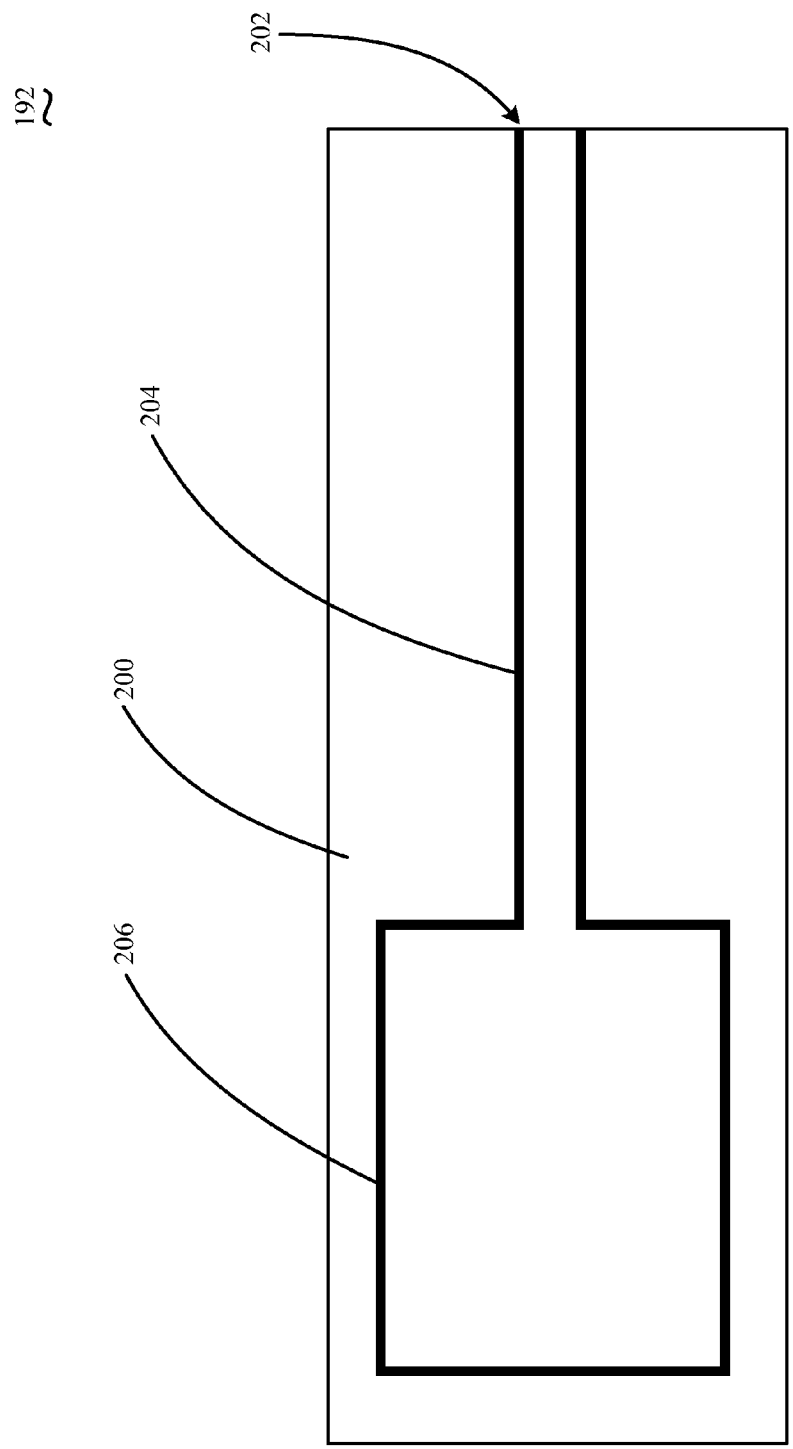
FIG. 6 is a simplified schematic diagram illustrating an example stationary substrate of the example electromagnetic flow controller of FIG. 5 according to embodiments of the disclosure.

Referring now to FIG. 6, the example deflecting substrate 192 may include a surface 200 with a deflecting substrate electrical trace 202 provided thereon. The deflecting substrate electrical trace 202 may further have a first portion 204 that may be relatively more proximal to the connection point 196 than a second portion 206. In certain embodiments, the second portion 206 of the deflecting substrate electrical trace 202 may have a loop shape as depicted. In other embodiments, the second portion may have a serpentine, spiral, or any suitable shape.

As discussed above, in certain embodiments, the deflecting substrate 192 may be constructed with a conductive material, such as a metal. In this case, the deflecting substrate electrical trace 202 may be electrically insulated from the deflecting substrate 192. In other words, the deflecting substrate 192 may include more than one layer, such as a metal layer and an electrically insulating layer on top of the metal layer. Therefore, the surface 200 of the deflecting substrate 192 may be the electrically insulating material. The deflecting substrate electrical trace 202 may be provided on top of the electrically insulating material, in a manner where it is not electrically shorted to the metal layer of the deflecting substrate 192.

In certain further embodiments, the deflecting substrate 192 may be constructed of more than two layers. For example, the deflecting substrate 192 may have a metal layer, with an adhesion promoting layer thereon, and an electrically insulating layer on top of the adhesion promoting layer. In yet other embodiments, the deflecting substrate 192 may be constructed from only non-conductive materials and the deflecting substrate electrical trace 202 may be provided directly on top of the non-conductive materials without an intermediate layer therebetween.

The insulating layer, if provided on the surface 200 of the deflecting substrate 192, may be any suitable insulating layer, such as dielectric materials that are commonly used in the semiconductor, circuit board, and electronics industries. The insulating materials may include, but are not limited to, silicon dioxide, tetraethylorthosilicate (TEOS) glass, dimethylsilane (2MS) deposited silicate glass, trimethylsilane (3MS) deposited silicate glass, methylsilane (MS) deposited silicate glass, silicate glass, silicon nitride, silicon carbonitride, silicon carbide, SiCOH, or combinations thereof. The insulating material may be deposited using a variety of suitable techniques, including, but not limited to chemical vapor deposition (CVD), plasma enhanced chemical vapor deposition (PECVD), physical vapor deposition (PVD), sputtering, evaporative deposition, spin-on deposition, atomic layer deposition (ALD), lamination, or combinations thereof.

The deflecting substrate electrical trace 202 may be constructed from any suitable material, such as, for example, a variety of metals, metallic stacks, intermetallics, semi-metals, and alloys, thereof. The metals may include, copper (Cu), aluminum (Al), gold (Au), titanium (Ti), tantalum (Ta), tungsten (W), tantulun nitride (TaN), titanium nitride (TiN), silver (Ag), cobalt (Co), nickel (Ni), or combinations, alloys, intermetallics, oxides, or nitrides, thereof. Alternatively, electrically conductive non-metallic materials may be utilized in forming the deflecting substrate electrical trace 202. Such materials may include, for example, doped semiconductor materials, such as degenerately doped polysilicon. The deflecting substrate electrical trace 202, may be fabricated using a variety of process steps, including, but not limited to, patterning, deposition, lift-off, chemical mechanical polishing, annealing or combinations thereof. The deflecting substrate electrical trace 202 may be pattered using a variety of suitable patterning techniques, including, but not limited to, photolithography, X-ray lithography, electron beam lithography, stenciling, screen printing, or combinations thereof. Furthermore, the deflecting substrate electrical trace 202 may be deposited using a variety of suitable techniques, including, but not limited to chemical vapor deposition (CVD), plasma enhanced chemical vapor deposition (PECVD), metal-organic chemical vapor deposition (MOCVD), physical vapor deposition (PVD), sputtering, evaporative deposition, atomic layer deposition (ALD), electroplating, electroless plating, or combinations thereof.

It will be appreciated that semiconductor fabrication, semiconductor packaging, circuit board fabrication, or electronics fabrication process technologies may be used for the fabrication of the deflecting substrate 192 and the electrical trace 202 thereon. Therefore, techniques, such as inlaid integration, damascene, lift-off, and the like may be used for the fabrication of the deflecting substrate 192. It will also be appreciated that if the deflecting substrate electrical trace 202 is fabricated in certain shapes, such as a spiral shape, then the deflecting substrate electrical trace 202 may be provided on multiple layers with electrical vias interconnecting the multiple layers.

Figure 7:
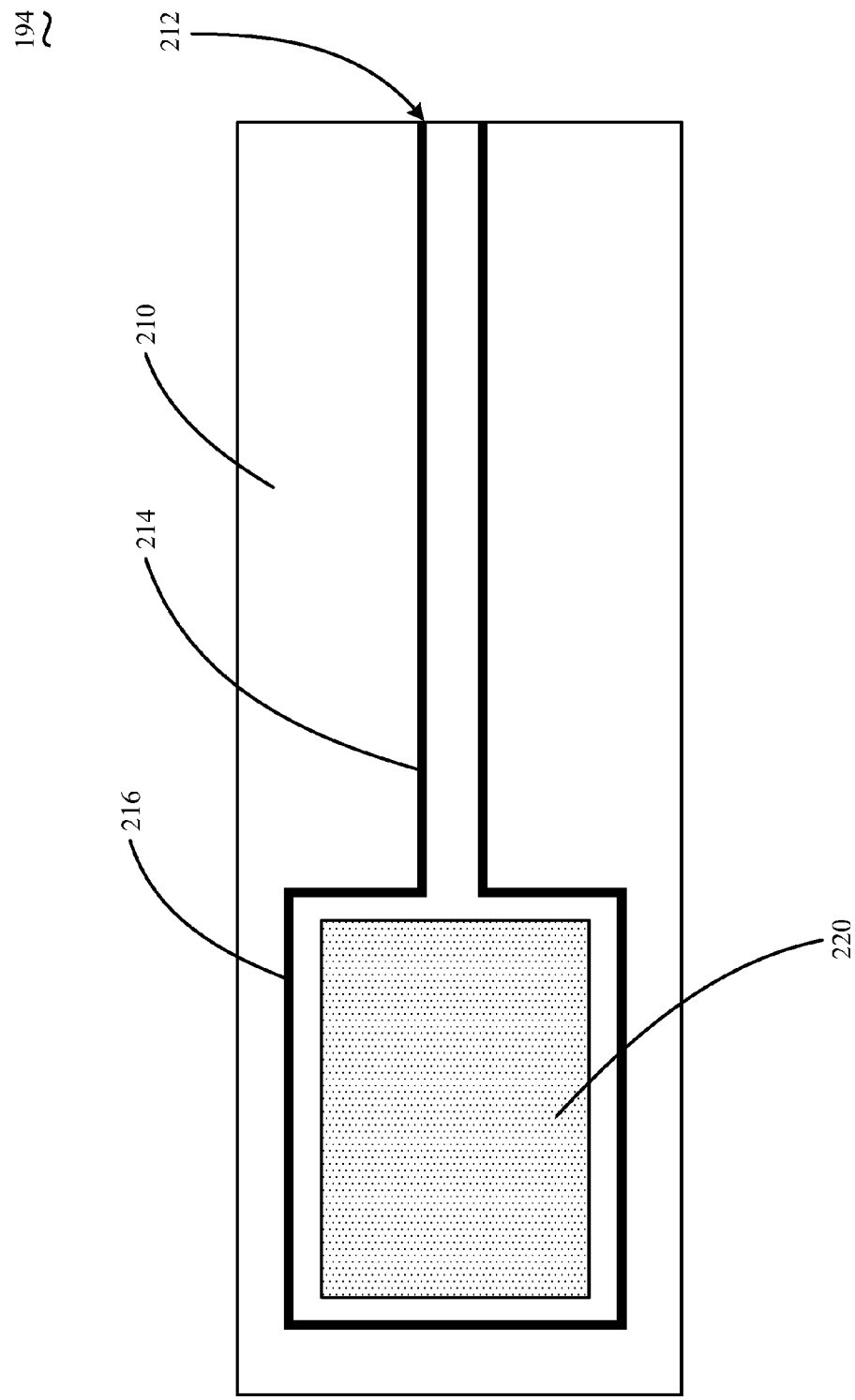
FIG. 7 is a simplified schematic diagram illustrating an example deflecting substrate of the example electromagnetic flow controller of FIG. 5 according to embodiments of the disclosure.

Referring now to FIG. 7, the example stationary substrate 194 may include a surface 210 with a stationary substrate electrical trace 212 provided thereon. The stationary substrate electrical trace 212 may further have a first portion 214 that may be relatively more proximal to the connection point 196 than a second portion 216. The stationary substrate electrical trace 212 may at least partially surround a permanent magnet 220 provided on the surface 210 in a location relatively distal to the connection point 196. Therefore, both the second portion 206 of the deflecting substrate electrical trace 202, as depicted in FIG. 6 and the permanent magnet 220 may be in relative proximity with each other. In certain embodiments, the second portion 216 of the stationary substrate electrical trace 212 may have a loop shape as depicted. In other embodiments, the second portion may have a spiral shape surrounding the permanent magnet 220, or any other suitable shape. It will also be appreciated that if the stationary substrate electrical trace 212 is fabricated in certain shapes, such as a spiral shape, then the deflecting substrate electrical trace 202 may be provided on multiple layers with electrical vias interconnecting the multiple layers.

As in the case of the deflecting substrate 192, in certain embodiments, the stationary substrate 194 may be constructed with a conductive material, such as a metal. In this case, the stationary substrate electrical trace 212 may be electrically insulated from the stationary substrate 194. In other words, the stationary substrate 194 may include more than one layer, such as a metal layer and an electrically insulating layer on top of the metal layer. Therefore, the surface 210 of the stationary substrate 194 may be the electrically insulating material. The stationary substrate electrical trace 212 may be provided on top of the electrically insulating material, in a manner where it is not electrically shorted to the metal layer of the stationary substrate 194.

The techniques, processes, and materials used to fabricate the stationary substrate 194 and the stationary substrate electrical trace 212 thereon, may be substantially similar to the techniques, processes, and materials used to fabricate the deflecting substrate 192 and the deflecting substrate electrical trace 202 thereon. Accordingly, in the interest of brevity, the discussion associated with fabrication of the stationary substrate 194, other than the permanent magnet 220, will not be repeated here.

The permanent magnet 220 may be fabricated using techniques similar to those used to fabricate the stationary substrate electrical trace 212. In particular, patterning and deposition processed may be used to fabricate the permanent magnet 220. The patterning techniques may include photolithography, X-ray lithography, electron beam lithography, stenciling, screen printing, or the like. The deposition techniques may include chemical vapor deposition (CVD), plasma enhanced chemical vapor deposition (PECVD), metal-organic chemical vapor deposition (MOCVD), physical vapor deposition (PVD), sputtering, evaporative deposition, atomic layer deposition (ALD), electroplating, electroless plating, or the like. The permanent magnet 220 may be fabricated from ferroelectric materials, including, but not limited to iron, cobalt, nickel, manganese, or combinations, oxides, alloys, or intermetallics thereof. The ferroelectric materials used to fabricate the permanent magnet 220 may have Curie temperatures, or otherwise critical temperatures where the ferroelectric materials loses magnetic domain coherence, of about 400° F. to about 1400° F.

Referring now to both FIG. 6 and FIG. 7, in operation, the electromagnetic flow controller 190 may be provided with an electrical signal on the deflecting substrate electrical trace 202. The electrical signal may be generated by a controller (not shown). The electrical signal may be a DC signal or a periodic or repeating signal, such as a sinusoidal wave, a square wave, a triangle wave, or the like. In one aspect, the deflecting substrate electrical trace may generate a magnetic field when the electrical signal is provided to the same. The magnetic field generated by the deflecting substrate electrical trace 202 may interact with the magnetic field of the permanent magnet 220 to cause the deflecting substrate 192 to deflect away or deflect towards the stationary substrate 194. In one aspect, when a periodic signal is applied to the deflecting substrate electrical trace 202, the deflecting substrate 192 may repeatedly repel away and pull in to the stationary substrate 194.

An electrical signal may also be provided to the stationary substrate electrical trace 212. This signal may be a direct current (DC) signal, and may be provided by a controller or signal generator (not shown). The electrical signal provided to the stationary substrate electrical trace 212 may provide for repeatable performance of the electromagnetic flow controller over time and under a variety of operating conditions. In certain embodiments, the electrical signal provided to the stationary substrate electrical trace 212 may allow the permanent magnet 220 to maintain magnetic domain coherence at temperatures near, at, or above the Curie temperature of the permanent magnet 220. In other words, a current flowing through the stationary substrate electrical trace 212 may generate a magnetic field in proximity of the permanent magnet 220, such that if the magnetic domains of the permanent magnet are in flux or are no longer aligned at high temperatures, then the magnetic field resulting from the current in the stationary substrate electrical trace 212 may realign the magnetic domains. In certain other embodiments, a non-DC signal may be provided on the stationary substrate electrical trace 212.

It will be appreciated that in certain embodiments, the permanent magnet 220 may be provided on the deflecting substrate 192. In these embodiments, the electrical signal to deflect the deflecting substrate 192 may be provided on the stationary substrate 194.

Figure 8:
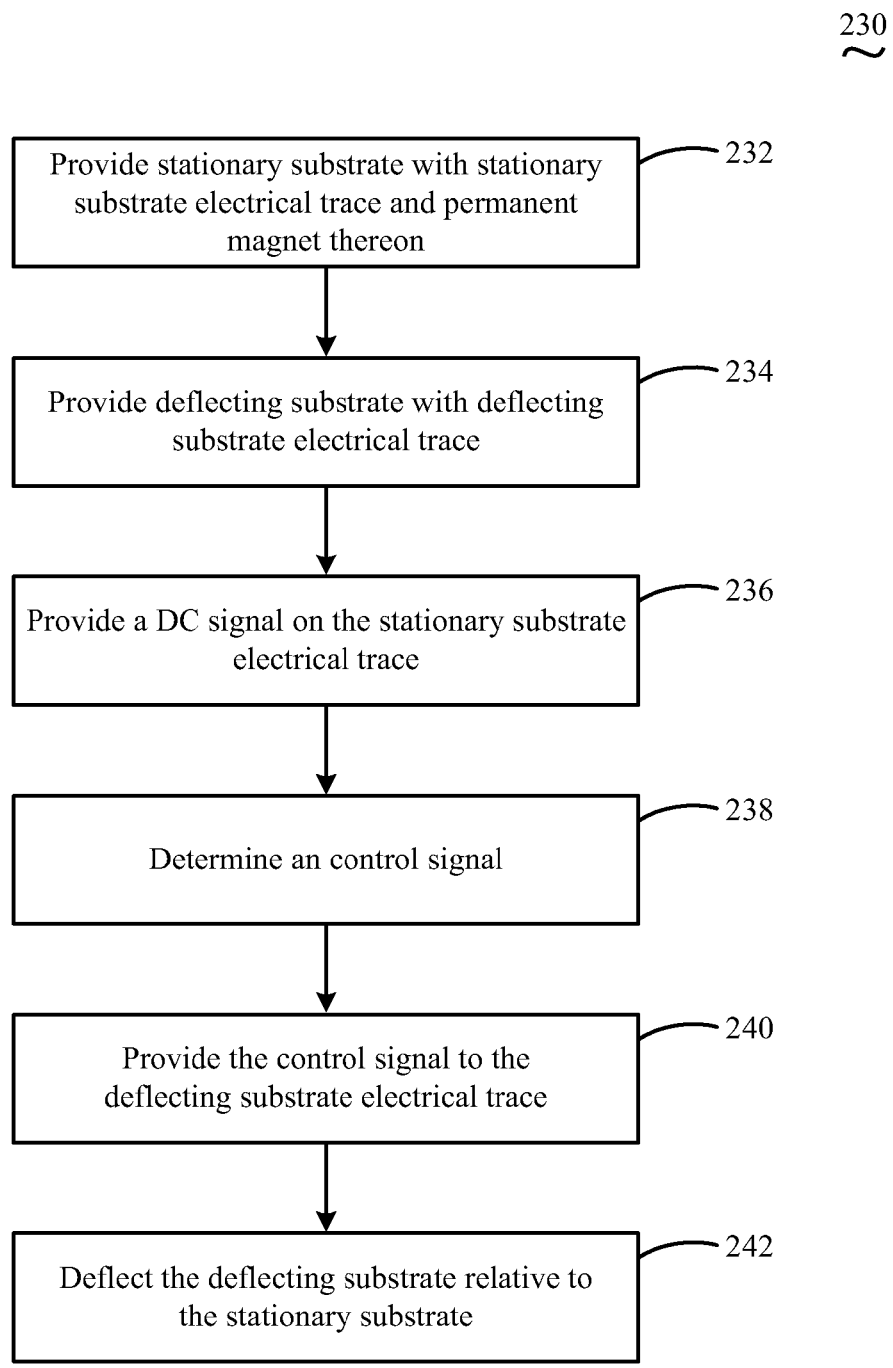
FIG. 8 is a flow diagram of an example method for operating the electromagnetic flow controller of FIG. 5 according to embodiments of the disclosure.

Referring now to FIG. 8, an example method 230 for deflecting the deflecting substrate 192 relative to the stationary substrate 194 of the electromagnetic flow controller 190 in accordance with embodiments of the disclosure. At block 232, the stationary substrate may be provided with the stationary substrate electrical trace and the permanent magnet thereon. As discussed in conjunction with FIG. 7, the stationary substrate 194 may be constructed with any variety of suitable materials and the stationary substrate electrical trace 212 may be electrically insulated from the stationary substrate 194 by a dielectric, or otherwise electrically insulating layer therebetween. As discussed above, the stationary substrate electrical trace 212 may further have multiple windings around the permanent magnet 220. The permanent magnet 220 may be constructed from any variety of suitable ferromagnetic materials.

At block 234, the deflecting substrate 192 may be provided with a deflecting substrate electrical trace 202 thereon. As described with reference to FIG. 6, the deflecting substrate 192 may be constructed with any variety of suitable materials and the deflecting substrate electrical trace 202 may be electrically insulated from the deflecting substrate 192 by a dielectric, or otherwise electrically insulating layer therebetween.

At block 236, a DC signal may be provided to the stationary substrate electrical trace 212. As described in conjunction with FIGS. 6 and 7, the purpose of the DC signal may be to maintain the magnetic characteristics of the permanent magnet 220 during operation at relatively high temperatures, such as temperatures near, at, or above the Curie temperature of the ferromagnetic materials used to construct the permanent magnet 220.

At block 238, a control signal may be determined. At block 240, the determined control signal may be provided to the deflecting substrate electrical trace 202. The control signal may be determined by a controller based on a variety of physical feedback and signals. For example, in the context of the combustion chamber nozzle assembly 100, the control signal may be based upon feedback related to the mixing of fuel and air in the vanes 160 of the fuel air mixing cylinder 116.

At block 242, the deflecting substrate 192 may deflect relative to the stationary substrate 194. The deflection may be based upon the control signal provided to the deflecting substrate electrical trace 202 at block 240. In certain embodiments, the deflection may repeat with time.

It should be noted, that the method 230 may be modified in various ways in accordance with certain embodiments of the invention. For example, one or more operations of method 230 may be eliminated or executed out of order in other embodiments of the invention. Additionally, other operations may be added to method 230 in accordance with other embodiments of the invention.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. An apparatus comprising:
   a first substrate with a first electrical trace thereon; and,
   a second substrate with a permanent magnet and a second electrical trace thereon and connected to the first substrate,
   wherein the first substrate deflects with respect to the second substrate when a first magnetic field generated by providing an electrical signal to the first electrical trace interacts with a second magnetic field of the permanent magnet.

2. The apparatus of claim 1, wherein the first substrate is constructed from at least one of: (i) nickel; (ii) copper; (iii) iron; (iv) titanium; (v) tantalum; (vi) tungsten; or (vii) cobalt.

3. The apparatus of claim 1, further comprising an insulation layer between the first substrate and the first electrical trace.

4. The apparatus of claim 3, wherein the insulation layer comprises at least one of: (i) silicon dioxide; (ii) tetraethylorthosilicate (TEOS) glass; (iii) dimethylsilane (2MS) deposited silicate glass; (iv) trimethylsilane (3MS) deposited silicate glass; (v) methylsilane (MS) deposited silicate glass; (vi) silicate glass; (vii) silicon nitride; (viii) silicon carbonitride; (ix) silicon carbide; or (x) SiCOH.

5. The apparatus of claim 1, wherein the second electrical trace at least partially surrounds the permanent magnet, the second electrical trace configured to receive a DC voltage for maintaining a magnetic domain coherence of the permanent magnet.

6. The apparatus of claim 1, wherein the second substrate is connected to the first substrate as a cantilever.

7. The apparatus of claim 6, wherein the first and second substrates substantially overlap with each other and the cantilever connection is proximate to a first edge of the first substrate and a second edge of the second substrate.

8. The apparatus of claim 7, wherein the permanent magnet is more distal from the first edge and the second edge than the cantilever connection.

9. The apparatus of claim 7, wherein the first substrate deflects relative to the second substrate at an edge of the first substrate that is most distal from the first edge.

10. A method comprising:
providing a first substrate with a first electrical trace thereon;
providing a second substrate with a permanent magnet and a second electrical trace thereon and connected to the first substrate;
generating a first magnetic field by providing a first electrical signal on the first electrical trace; and,
deflecting the first substrate from with respect to the second substrate based at least in part on an interaction between the first magnetic field and a second magnetic field of the permanent magnet.

11. The method of claim 10, further comprising providing a DC voltage on the second electrical trace.

12. The method of claim 10, wherein the first electrical signal is one of a DC signal or a repeating signal.

13. The method of claim 12, wherein the DC signal is based at least in part on a magnitude of deflection of the first substrate from the second substrate.

14. The method of claim 10, further comprising modulating at least one of an amplitude, a frequency, a phase, or a signal type of the first electrical signal to control the deflection of the first substrate from the second substrate.

15. The method of claim 10, wherein the first electrical signal can be at least one of: (i) a sinusoidal wave; (ii) a square wave; (iii) a pulse train; (iv) a triangle wave; or (v) a pulse width modulated wave.

16. The method of claim 10, further comprising:
providing a second electrical signal on the second electrical trace to maintain a magnetic domain coherence of the permanent magnet.

17. A system comprising:
a vane with an inner surface and an outer surface;
an orifice through the vane extending from the inner surface to the outer surface; and,
at least one electromagnetic flow controller disposed in proximity of the orifice on the inner surface,
wherein a first fluid flows from the inner surface through the orifice and at least partially mixes with a second fluid after flowing through the orifice, and wherein each of the at least one electromagnetic flow controllers comprise:
a first substrate with a first electrical trace thereon; and,
a second substrate with a permanent magnet and a second electrical trace thereon and connected to the first substrate,
wherein the first substrate deflects from the second substrate when an electrical signal is provided to the first electrical trace.

18. The system of claim 17, further comprising at least one electromagnetic flow controller disposed in proximity of the orifice on the outer surface.

19. The system of claim 17, wherein the electrical signal provided to each of the at least one flow controllers can be determined to reduce fluctuation in the flow of the first fluid.

20. The system of claim 17, wherein the first fluid is a combustible fuel and the second fluid comprises at least one oxidizer.

* * * * *